March 12, 1957  J T LUKE  2,785,296
JOURNAL SAFETY DEVICE
Filed March 16, 1954
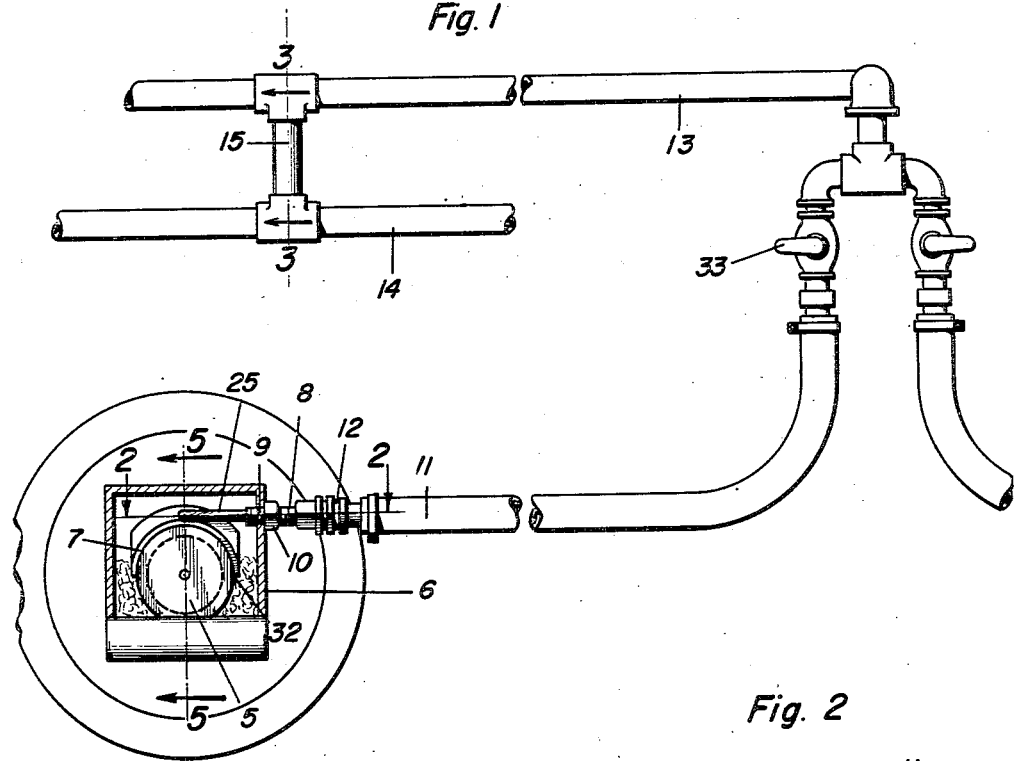
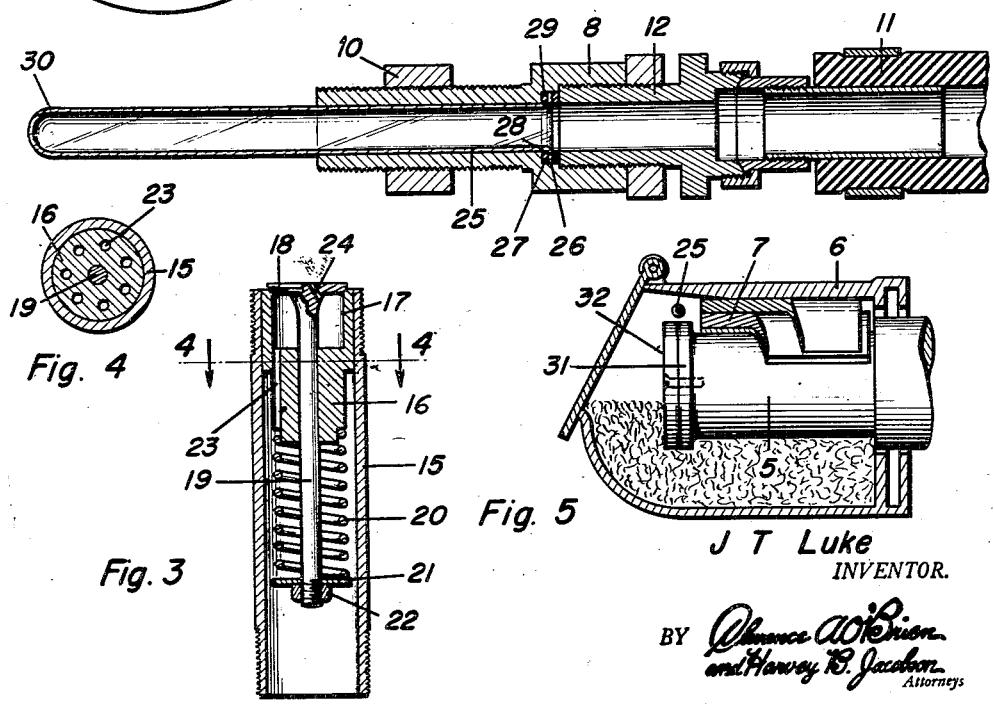
J T Luke
INVENTOR.

United States Patent Office 2,785,296
Patented Mar. 12, 1957

2,785,296
JOURNAL SAFETY DEVICE
J T Luke, Amarillo, Tex.
Application March 16, 1954, Serial No. 416,666
2 Claims. (Cl. 246—169)

The present invention relates to new and useful improvements in railway equipment safety devices and more particularly to a safety device for the journal of railway rolling stock to automatically apply the brakes upon overheating of the journal.

An important object of the invention is to provide a frangible member supported in a position adjacent the journal and lowered into contact with the axle upon a predetermined wear in the bearing to break the frangible member and allow air to escape from the brake system, thereby reducing air pressure in the supply line and applying the brakes.

Another object of the invention is to provide an emergency brake applying attachment of this character which will function before damage has been caused to the journal or journal box bearing due to overheating of the journal and thus avoid very costly repairs thereto.

A still further object is to provide a device of this character of simple and practical construction, which is efficient and reliable in operation, relatively inexpensive to manufacture and install in operative position and which is otherwise well adapted for the purpose for which the same is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view of the attachment with parts broken away and shown in section;

Figure 2 is an enlarged longitudinal sectional view taken on a line 2—2 of Figure 1;

Figure 3 is an enlarged longitudinal sectional view of the emergency valve for the air line;

Figure 4 is an enlarged transverse sectional view taken on a line 4—4 of Figure 3, and Figure 5 is a vertical sectional view of the journal box taken on a line 5—5 of Figure 1.

Referring now to the drawing in detail wherein for the purpose of illustration I have disclosed a preferred embodiment of the invention, the numeral 5 designates the journal for the axle of a railway car, the journal being enclosed in a journal box 6, and provided with a journal bearing 7 which is usually composed of brass having a babbitted bearing face which rests on the journal and which supports the box 6.

An externally threaded sleeve 8 is threaded in an opening 9 in one side of the journal box 6 and is secured thereto by a nut 10. An air hose 11 is connected to the outer end of sleeve 8 by means of a fitting 12 threaded in the rear end of the sleeve, and the hose leads to a branch pipe 13 which is connected to the air supply line 14 of an air brake system by means of a tubular, vertically supported valve housing 15. A valve guide 16 is suitably secured in the upper end of housing 15 and a valve seat 17 is formed at the upper end of the valve guide and with which a valve 18 is engageable. Valve 18 includes a stem 19 which is slidable in guide 16 and a coil spring 20 is positioned at the lower end of the valve rod between the guide 16 and a washer 21 secured on the lower end of the valve rod by an adjusting nut 22. A plurality of vertical passages 23 are formed in the guide 16 and a bleed port 24 is formed in valve 18.

A glass tube 25 is positioned in sleeve 8 and formed with an outwardly projecting flange 26 at its inner end which is clamped between a pair of washers 27 and 28 and which in turn are clamped against an internal shoulder 29 in sleeve 8 by the adjacent end of fitting 12. The tube 25 projects outwardly beyond the end of sleeve 8 and the outer end of the tube is closed as indicated at 30. The sleeve 8 is rigidly anchored in the journal box 6 and with the tube 25 supported slightly above and spaced from the flange or collar 31 at the outer end of journal 5. A disk 32 is secured to the outer surface of flange or collar 31 to increase the contacting area for the tube.

An angle cock 33 is placed in the branch air line 13 to cut off air pressure leading to the air hose 11, should the latter become broken and while the same is being repaired.

In the operation of the device, spring 20 normally holds valve 18 closed and air pressure in the air supply line 14 will pass through port 24 to maintain pressure in tube 25 and line 14 equalized. The air tube 25 is supported in a position sufficiently spaced from the periphery of flange or collar 31 of the journal 5 so as not to contact the journal during normal conditions in the running of the train.

However, should journal 5 become overheated and cause the babbitt of bearing 7 to wear thin, the decrease in the thickness of the bearing will cause a lowering movement of the box 6 corresponding to the wear of the bearing and tube 25 will likewise be lowered until it contacts the flange 31 or disk 32 and eventually breaks the tube.

The breaking of tube 25 will permit escape of air from the air supply line of the brake system and result in an emergency application of the brakes.

Port 24 permits air from supply line 14 to enter pipe 13, hose 11 and tube 25 to charge the same while the valve 18 remains closed, and when tube 25 is broken the sudden decrease in air pressure in pipe 13 will cause the relatively greater pressure in line 14 to overcome the tension of spring 20 to open the valve and apply the brakes.

What is claimed as new is as follows:

1. The combination with a railroad car including an air-brake system, a journal box, a bearing in said box and a supporting journal for the box rotatable in the bearing, of a flexible air line connected at one end to the system, a breakable glass tube in the box connected to and closing the other end of the air line, said tube extending over the journal for engagement therewith to be fractured thereby upon failure of the bearing, said tube being threaded through the box for adjustment toward or away from the journal, and a lock nut threaded on the tube and engaged with the box for securing said tube in adjusted position.

2. The combination with a railroad car including an air brake system, a journal box, a bearing in said box and a journal rotatable in said bearing, of a safety device comprising a disk mounted on the free end of the journal, a breakable glass tube mounted in the box, said tube including a closed end portion extending over the disk in spaced relation thereto to be engaged and broken thereby upon a predetermined wear in the bearing, and means connecting the other end of said tube to the air brake system for releasing the air therein and setting the brakes when said tube is broken.

References Cited in the file of this patent

UNITED STATES PATENTS

| | | |
|---|---|---|
| 395,555 | Everitt | Jan. 1, 1889 |
| 586,561 | Mosher | July 20, 1897 |
| 870,284 | Guffey | Nov. 5, 1907 |
| 878,263 | Winsor | Feb. 4, 1908 |
| 937,991 | Gibson | Oct. 26, 1909 |
| 2,133,491 | Turner | Oct. 18, 1938 |
| 2,420,924 | Whittaker | May 20, 1947 |
| 2,424,203 | Wrightman et al. | July 15, 1947 |
| 2,428,720 | Nicholas | Oct. 7, 1947 |
| 2,501,715 | Ferguson | May 28, 1950 |
| 2,708,895 | Ward | May 24, 1955 |